United States Patent Office 3,361,691
Patented Jan. 2, 1968

3,361,691
ETHYLENE - PROPYLENE - NON - CONJUGATED
DIENE ELASTOMERS STABILIZED WITH EPOXY
ESTER-PHOSPHITE MIXTURES
Russell A. Mazzeo, Waterbury, Conn., assignor to
Uniroyal, Inc., a corporation of New Jersey
No Drawing. Filed Apr. 21, 1965, Ser. No. 449,892
6 Claims. (Cl. 260—23.7)

This invention relates to the stablization of an unsaturated elastomer which is a terpolymer of two different monoolefins, usually ethylene and propylene, and a non-conjugated diene, hereinafter referred to as EPDM. More particularly the invention relates to the use of an epoxidized soy bean oil or an epoxidized ester of a higher fatty acid, in conjunction with an aryl phosphite in an EPDM polymer to impart color stability upon heat aging of the polymer.

Unsaturated EPDM polymer is a particularly difficult material to stabilize, especially against discoloration upon heat aging. Thus, epoxides such as epoxidized soy bean oil or epoxidized higher fatty acid esters do not prevent this unsaturated polymer from turning yellow and eventually brown upon heat aging. Similarly, tri(alkylphenyl) phosphites do not prevent the unsaturated EPDM polymer from darkening as a result of heat exposure. Individually, the described epoxides or phosphites therefore are not effective stabilizers against undesirable color changes in unsaturaed EPDM upon heat aging.

The invention is based on the surprising discovery that, contrary to what would be expected from the effect of the described epoxide or phosphite individually when the two are combined in unsaturated EPDM terpolymer rubber there is a remarkable synergism and the polymer is rendered highly resistant to undesirable color changes upon heating.

The EPDM employed in the invention is of course a conventional material, and may be defined as a co-polymer of at least two different monoolefins (usually ethylene and propylene although other pairs of monoolefins may be employed) with a small amount of at least one copolymerizable multiolefin. Usually the multiolefin contains from 5 to 22 carbon atoms and has two double bonds separated by more than two carbon atoms. The multiolefin ordinarily comprises from about 0.5 to not greater than about 20 mole percent of the interpolymer and the ethylene and propylene units are present in ratios from about 1:4 to about 3:1. Examples of suitable multiolefins are straight or branched chain diolefins, such as those in which both double bonds are terminal as in 1,4-pentadiene, 1,5-hexadiene(biallyl), 2-methyl-1,5 - hexadiene, 3,3-dimethyl-1,5-hexadiene, 1,7-octadiene 1,9-decadiene, 1,19-eicosadiene, and the like; diolefins in which only one double bond is terminal such as 1,4-hexadiene, 1,9-octadecadiene, 6-methyl-1,5-heptadiene, 7-methyl-1,6-octadiene, 11-ethyl-1,11-tridecadiene, and similar compounds in which the internal double bond is shielded. Also suitable are the bridged-ring hydrocarbons of similar nature including endocyclic hydrocarbons containing 7 to 10 carbon atoms and two double bonds especially those containing a methane or an ethane bridge, for example: (a) unsaturated derivatives of bicyclo[2,2,1] heptane containing at least two double bonds, including bicyclo [2,2,1] hepta-2,5-diene; dicyclopentadiene (also named 3a, 4, 7a-tetrahydro-4,7-methanoindene), tricyclopentadiene, and tetracyclopentadiene; (b) unsaturated derivatives of bicyclo[2,2,2] octane containing at least two double bonds, including bicyclo[2,2,2] octa-2,5-diene; (c) unsaturated derivatives of bicyclo[3,2,1] octane containing at least two double bonds; (d) unsaturated derivatives of bicyclo[3,3,1]-nonane containing at least two double bonds; (e) unsaturated derivatives of bicyclo [3,2,2] nonane containing at least two double bonds, and the like. Preferred are dicyclopentadiene, 1,4-hexadiene, and methylene norbornene.

The epoxides employed in the invention are substantially soluble in hydrocarbon solvents (e.g. hexane), substantially insoluble in water, do not boil at temperatures normally encountered in processing EPDM, and are selected from the group consisting of epoxidized soy bean oil and epoxidized higher fatty acid esters, typified by esters of $C_{10}$ to $C_{30}$ fatty acids with alkanols having up to 10 carbon atoms (e.g. methyl alcohol, octyl alcohol, decyl alcohol, and the like). Examples of commercial types of epoxidized soy bean oil are such materials as Paraplex G–60, G–61, G–62 and Flexol EPO, which have an average molecular weight of 1000 (see, for example, U.S. Patent 2,829,135). Epoxidized higher fatty acid esters are represented by such commercial materials as Drapex 3.2, octyl epoxy stearate having a molecular weight of 410, or Monoplex S–71, an epoxidized oleate ester with an average molecular weight of 380. Epoxide contents in such materials frequently run from about 2% to about 10%.

The aryl phosphite employed in the invention along with the described epoxide, is typically a triaryl phosphite, especially a triphenyl phosphite in which the phenyl groups are substituted with alkyl radicals, preferably higher alkyl groups (e.g., $C_8$–$C_{30}$), as described in U.S. Patent 2,733,226, Hunter, January 31, 1956. Examples are tri(o-octylphenyl) phosphite, tri(p-nonylphenyl) phosphite, tri(p-dodecylphenyl) phosphite, tri(dinonylphenyl) phosphite, mono(nonylphenyl) di(octylphenyl) phosphite, tri(mixed nonylated phenyl) phosphite and the like.

For purposes of the invention there may be employed from 0.1 to 1.0 phr. (parts per hundred of rubber, by weight) of the described phosphite and from 0.5 to 5.0 phr. of the described epoxide, provided that the amount of epoxide is from 50% to 500% on the weight of the phosphite.

The described epoxide and phosphite may be added to the EPDM polymer at any time at which it is desired to protect the polymer from the adverse effects of aging. Thus, the epoxide and phosphite are suitably added to the solution or cement, in which the EPDM is prepared, at the conclusion of the polymerization reaction and prior to the steps of recovery and purification of the EPDM. The epoxide and phosphite are conveniently added in the form of a solution in an organic solvent, suitably the same solvent as the solvent used in the polymerization reaction, e.g., hexane after the cement is washed. The EPDM is thereafter recovered from the cement in the usual manner, that is, unreacted monomers are removed and catalyst is deactivated. Solvent removal and washing of the polymer, usually with an aqueous medium, are followed by drying of the EPDM, usually at elevated temperature.

While it is not desired to limit the invention to any particular theory of operation, it is believed to be possible that the present epoxide prevents the hydrolysis of the phosphite and also complexes with residual catalyst and other impurities whose effects are detrimental to polymer color and stability.

It is conventional to add certain epoxides to the tris(alkylphenyl) phosphites of Hunter, U.S. Patent 2,733,226 to remove traces of acidic impurities, but the epoxides employed for that purpose are different from the presently employed epoxides which are in general higher molecular weight readily hydrocarbon-soluble and substantially water-insoluble materials, namely, those selected from the group consisting of epoxidized soy bean oil and epoxidized higher fatty acid esters. Furthermore, only a small amount of epoxide (0.1%–10% on the weight of the phosphite) is used to remove traces of acidic impurities from the phosphite in prior practice, whereas in the present invention there is employed, as stated previously, from 50% to 500% of specified epoxide on the weight of the phosphite. The trace amount of epoxide added to the commercial tris(alkylphenyl) phosphite is believed to be essentially consumed by reaction with traces of residual acid in the phosphite, and/or is subsequently volatilized, so that there would ordinarily be little or no remaining available epoxide in the phosphite. In addition, the conventional practice is to use a relatively low molecular weight, water-soluble material such as propylene oxide to neutralize traces of acid remaining in the phosphite; such a material would be unsuitable for the present purpose, even if used in sufficiently large amount, because it would be washed out of the EPDM and lost in the water used to purify the polymer. The presently employed epoxide materials are substantially hydrocarbon-soluble, thus facilitating their introduction into the EPDM cement in the form of a solution in hexane or the like. Also, the present epoxides have a sufficiently high molecular weight and a sufficiently high boiling point so that they do not boil away at temperatures normally encountered in EPDM recovery and processing.

The following examples, in which all quantities are expressed by weight, will serve to illustrate the practice of the invention in more detail. The EPDM polymers used in the invention were made with vanadium oxytrichloride-ethylaluminum sesquihalide catalyst. Traces of catalyst or residues thereof were believed to be present in the polymers.

*Example 1*

This example illustrates the enhancement of the antioxidant properties of a tris(alkylphenyl) phosphite by means of epoxidized soy bean oil when the epoxide is added in conjunction with the phosphite to washed EPDM cement. Three samples of unsaturated EPDM polymer (e.g., a terpolymer containing ethylene/propylene in 55/45 weight ratio and dicyclopentadiene; iodine number, 10; intrinsic viscosity in tetralin at 135° C., 2.5) each stabilized differently as shown in Table I, below, and a control sample containing no stabilizer, were heat aged at 130° C. for 16, 24 and 48 hours. The percent gel in the polymer was determined, with the results shown in Table I.

TABLE I

| Sample | Amounts of Additives (phr.) | | Percent Gel After Heat Aging at 130° C. for— | | | |
|---|---|---|---|---|---|---|
| | "Polygard" tris(nonyl-phenyl) phosphite | "Paraplex G-62" epoxidized soy bean oil | 0 Hrs. | 16 Hrs. | 24 Hrs. | 48 Hrs. |
| I-A | None | None | 17.7 | 71.1 | 72.1 | (¹) |
| I-B | 1.0 | None | 20.0 | 42.2 | 63.1 | 80.5 |
| I-C | 0.5 | 1.0 | 24.9 | 29.2 | 18.3 | 70.9 |

¹ Resinified.

The tris(nonylphenyl)phosphite employed ("Polygard") was a tris (mixed mono-dinonylphenyl) phosphite and had at the time of manufacture been treated with a small amount (e.g., 1.5% on the weight of the phosphite) of propylene oxide to free it from traces of acid impurities.

The epoxide employed in Table I was "Paraplex G-62," an epoxidized soy bean oil with an average molecular weight of 1000.

*Example 2*

This example illustrates improved color stability in heat aged unsaturated EPDM containing "Polygard" and "Drapex 3.2" (octyl epoxy stearate). A washed 6% solution of EPDM (e.g. ethylene-propylene-dicyclopentadiene terpolymer; E/P ratio, 70/30; iodine number, 12; intrinsic viscosity in tetralin at 130° C., 2.3) in hexane containing 0.5 phr. "Polygard" may be separated into two portions and to one of the fractions, 1 phr. of "Drapex 3.2" may be stirred in. Both samples may be flocculated by allowing the solvent to evaporate. The solid rubber samples may then be placed in an oven set at 130° C. for three hours. The sample containing the epoxide does not discolor whereas the sample that did not contain the epoxide turns yellow. The results are shown in Table II.

TABLE II

| Sample | Amounts of Additives (phr.) | | Color After Heat Aging 3 Hours at 130° C. |
|---|---|---|---|
| | "Polygard" | "Drapex 3.2". | |
| II-A | 0.5 | None | Yellow. |
| II-B | 0.5 | 1.0 | White. |

*Example 3*

Unsaturated EPDM, as described in Example 1, in the form of a hexane solution (cement) was washed twice with distilled water in a Waring Blendor—separating the cement from the water after each washing. The washed cement was stabilized with 1 phr. "Polygard" and divided into two portions. "Paraplex G-62" (1 phr.) was added to one portion and the other portion was not treated so as to serve as a control. The samples were flocculated by allowing the solvent to evaporate. The solid rubber samples were then heat aged in an oven set at 350° F. for one hour. The results of this study are tabulated in the following table.

TABLE III

| Sample | Amount of Additives (phr.) | | Color of Sample After Heat Aging 1 Hr. at 350° F. |
|---|---|---|---|
| | "Polygard" | "Paraplex G-62" | |
| III-A | 1.0 | 1.0 | White. |
| III-B | 1.0 | None | Light Tan. |

*Example 4*

This example illustrates the synergistic effect of combining organic phosphite and the present epoxide in unsaturated EPDM as determined by oxygen absorption. This clearly established finding of synergism of antioxidant combinations in unsaturated compounds, as shown in Table IV below, is indeed extraordinary. All samples in this example were prepared separately from a single drum of washed ethylene-propylene-dicyclopentadiene terpolymer rubber cement containing no other stabilizer. The polymer had 62% ethylene, iodine number 11.6, no gel in cyclohexane, intrinsic viscosity in tetralin at 135° C. 2.2. The phosphite and epoxide were added to the rubber cement; samples were dried at room temperature in air.

The figure tabulated in Table IV as $T_{20}$ is the time in minutes to absorb 20 ml. of oxygen per gram of polymer at 150° C. in an atomsphere of oxygen, and is a direct measure of stability.

TABLE IV.—INTERACTION OF TRIS (ALKYLPHENYL) PHOSPHITE AND EPOXY COMPOUND

| Sample | Additives (phr.) | | Absorption Time ($T_{20}$) Minutes |
|---|---|---|---|
| | "Polygard" | "Paraplex G-62" | |
| IV-A | 0.2 | 0.8 | 68 |
| IV-B | 0.4 | 0.8 | 204 |
| IV-C | 0.8 | 0.8 | 342 |
| IV-D | 1.2 | 0.8 | 369 |
| IV-E | | | 29 |
| IV-F | | 0.2 | 38 |
| IV-G | | 0.4 | 39 |
| IV-H | | 0.5 | 33 |
| IV-I | | 0.8 | 40 |

It will be seen from Table IV that the epoxide alone has no appreciable effect on stability (Samples IV-F to IV-I), but in combination with "Polygard" (Samples IV-A to IV-D) there is a synergistic interaction.

Having thus described my invention, what I claim and desire to protect by Letters Patent is:

1. A composition comprising 100 parts by weight of an unsaturated, elastomeric terpolymer of ethylene, propylene and a copolymerizable nonconjugated diene, from 0.1 to 1.0 part by weight of a tri(alkylphenyl) phosphite in which the alkyl group has from 8 to 30 carbon atoms and from 0.5 to 5.0 parts by weight of an expoxide selected from the group consisting of epoxidized soy bean oil and epoxidized esters of fatty acids having from 10 to 30 carbon atoms with alkanols having up to 10 carbon atoms, the amount of epoxide being from 50% to 500% of the weight of the phosphite.

2. A composition comprising 100 parts by weight of an unsaturated, elastomeric terpolymer of ethylene, propylene and dicyclopentadiene, from 0.1 to 1.0 part by weight of a tri(alkylphenyl) phosphite in which the alkyl group has from 8 to 30 carbon atoms and from 0.5 to 5.0 parts by weight of epoxidized soy bean oil, the amount of epoxidized soy bean oil being from 50% to 500% of the weight of the phosphite.

3. A composition comprising 100 parts by weight of an unsaturated, elastomeric terpolymer of ethylene, propylene, and dicyclopentadiene, from 0.1 to 1.0 part by weight of a tri(alkylphenyl) phosphite in which the alkyl group has from 8 to 30 carbon atoms and from 0.5 to 5.0 parts by weight of an epoxidized ester of a fatty acid having from 10 to 30 carbon atoms with an alkanol having up to 10 carbon atoms, the amount of epoxidized ester being from 50% to 500% of the weight of the phosphite.

4. A composition comprising 100 parts by weight of an unsaturated, elastomeric terpolymer of ethylene, propylene and dicyclopentadiene, from 0.1 to 1.0 part by weight of tri(nonylphenyl) phosphite and from 0.5 to 5.0 parts by weight of an epoxide selected from the group consisting of epoxidized soy bean oil and expoxidized esters of fatty acids having from 10 to 30 carbon atoms with alkanols having up to 10 carbon atoms, the amount of epoxide being from 50% to 500% of the weight of the phosphite.

5. A composition comprising 100 parts by weight of an unsaturated, elastomeric terpolymer of ethylene, propylene and dicyclopentadiene, from 0.1 to 1.0 part by weight of tri(nonylphenyl) phosphite and from 0.5 to 5.0 parts by weight of epoxidized soy bean oil, the amount of epoxidized soy bean oil being from 50% to 500% of the weight of the phosphite.

6. A composition comprising 100 parts by weight of an unsaturated, elastomeric terpolymer of ethylene, propylene and dicyclopentadiene, from 0.1 to 1.0 part by weight of tri(nonylphenyl) phosphite and from 0.5 to 5.0 parts by weight of an epoxidized ester of a fatty acid having from 10 to 30 carbon atoms with an alkanol having up to 10 carbon atoms, the amount of epoxidized ester being from 50% to 500% of the weight of the phosphite.

References Cited

UNITED STATES PATENTS

| 3,132,027 | 5/1964 | Norton et al. | 99—169 |
| 3,244,661 | 4/1966 | Kline | 260—29.7 |
| 3,244,662 | 4/1966 | Strauss et al. | 260—29.7 |

DONALD E. CZAJA, *Primary Examiner.*

R. A. WHITE, *Assistant Examiner.*